(12) United States Patent
Melchiors et al.

(10) Patent No.: US 6,531,535 B2
(45) Date of Patent: Mar. 11, 2003

(54) AQUEOUS COPOLYMERS, A PROCESS FOR THEIR PREPARATION AND THEIR USE IN COATING COMPOSITIONS

(75) Inventors: Martin Melchiors, Leverkusen (DE); Rolf Bachmann, Bergisch Gladbach (DE); Wieland Hovestadt, Leichlingen (DE); Karl-Ludwig Noble, Bergisch Gladbach (DE); Harald Blum, Leverkusen (DE)

(73) Assignee: Bayer Aktigensellschaft, Leverkusen (DE)

( * ) Notice: Subject to any disclaimer, the term of this patent is extended or adjusted under 35 U.S.C. 154(b) by 0 days.

(21) Appl. No.: 10/105,864

(22) Filed: Mar. 25, 2002

(65) Prior Publication Data

US 2002/0151638 A1 Oct. 17, 2002

Related U.S. Application Data

(62) Division of application No. 09/490,197, filed on Jan. 24, 2000, now Pat. No. 6,399,691.

(30) Foreign Application Priority Data

Jan. 29, 1999 (DE) .......................................... 199 03 391

(51) Int. Cl.$^7$ ................................................. C08J 3/02
(52) U.S. Cl. ...................... 524/457; 524/458; 524/460; 524/599; 524/612; 526/73; 526/80; 526/319; 526/320; 526/346
(58) Field of Search ................................. 524/457, 458, 524/460, 599, 612; 526/73, 80, 319, 320, 346

(56) References Cited

U.S. PATENT DOCUMENTS

| 3,821,145 | A | * | 6/1974 | Walus .......................... 260/29.4 |
| 4,151,143 | A |   | 4/1979 | Blank et al. ......... 260/29.6 RW |
| 4,414,283 | A |   | 11/1983 | Tobias ......................... 428/461 |
| 5,075,370 | A |   | 12/1991 | Kubitza et al. ............. 524/591 |
| 5,252,696 | A |   | 10/1993 | Laas et al. .................... 528/49 |
| 5,266,361 | A |   | 11/1993 | Schwarte et al. ......... 427/407.1 |
| 5,275,847 | A |   | 1/1994 | Schwarte et al. ......... 427/407.1 |
| 5,670,600 | A |   | 9/1997 | Nienhaus et al. ............. 528/75 |
| 5,876,802 | A |   | 3/1999 | Brunnemann et al. ...... 427/409 |

FOREIGN PATENT DOCUMENTS

| CA | 2090144 | 8/1993 |
| DE | 198822891 | 9/1998 |
| JP | 55-82166 | 6/1980 |
| JP | 4-1245 | 1/1992 |
| WO | 94/04581 | 3/1994 |
| WO | 99/67339 | 12/1999 |

\* cited by examiner

Primary Examiner—David W. Wu
Assistant Examiner—William Cheung
(74) Attorney, Agent, or Firm—Joseph C. Gil; Thomas W. Roy

(57) ABSTRACT

The present invention relates to a hydroxy-functional copolymer P, which is present as a dispersion and/or solution in water, and is obtained by successively carrying out process steps A–D:

A) initially introducing a hydrophobic polymer containing hydroxyl groups into a reaction vessel, B) introducing an initiator component into that vessel, C) subsequently polymerizing a hydrophobic monomer mixture containing hydroxyl groups in that vessel and D) subsequently polymerizing a hydrophilic monomer mixture containing hydroxyl and acid groups in that vessel. The present invention also relates to a process for the preparation of copolymers P following the procedure previously set forth and to coating compositions containing these copolymers P and one or more crosslinking agents.

9 Claims, No Drawings

AQUEOUS COPOLYMERS, A PROCESS FOR THEIR PREPARATION AND THEIR USE IN COATING COMPOSITIONS

This application is a divisional application of U.S. Ser. No. 09/490,197, filed Jan. 24, 2000 now U.S. Pat. No. 6,399,691.

BACKGROUND OF THE INVENTION

1. Field of the Invention

The invention relates to new aqueous copolymers, a process for their preparation and their use in coating compositions.

2. Description of the Prior Art

It is known from a large number of publications and patents to employ dispersions based on copolymers in water-dilutable paints and coating compositions.

For example, EP-A 225,612 and DE-A 3,543,361 describe polymer dispersions which dry by physical means and are prepared by a two-stage polymerization process, wherein one of the two stages use monomers containing carboxyl groups. Ammonia is employed as a neutralizing agent to achieve a good resistance of the coatings to water. The addition of other neutralizing agents impairs the resistance of the films to water. Monomers containing hydroxyl groups are not used since these can adversely influence the resistance to water.

EP-A 363,723, DE-A 4,009,858, DE-A 4,009,931, EP-A 521,919, DE 4,009,932 and EP 365,775 each describe processes for the preparation of multi-layered coatings, in which a base layer is first applied, a polymer film is formed therefrom, a top layer is then applied and the base layer and top layer are subsequently stoved together. Copolymer dispersions obtained by a two-stage preparation process are employed for the base or top layer, optionally in combination with aminoplast resins. By using these specific copolymer dispersions, higher layer thicknesses and good optical properties of the films are possible. A disadvantage of all these dispersions is the high content of carboxyl-functional monomers in the hydrophilic copolymer portion.

JP-A 80/82 166 describes polyacrylate dispersions which are prepared in two stages and contain carboxyl groups in both stages. This leads to dispersions with relatively low solids contents and coatings having reduced resistance to water.

U.S. Pat. No. 4,151,143 describes polyacrylate dispersions, which are prepared in two stages, wherein the 1st stage is prepared in an organic solution and is then dispersed, and an emulsion polymerization is carried out in the presence of the 1st stage. Products of high molecular weights, unfavorable film formation and overall different properties to conventional secondary dispersions result from this.

EP-A 557,844 describes aqueous two-component polyurethane coating compositions containing emulsion copolymers, which are essentially free from carboxylate groups and stabilized by external emulsifiers, and hydrophilic polyisocyanates. Because of the high molecular weights of the polymers and the remaining hydrophilicity in the case of external emulsifiers, such coating systems still have deficiencies in resistance to water, wetting of pigments and optical properties of the films for some applications.

EP-A 358,979 describes aqueous two-component polyurethane reactive systems, which have good properties. However, improvements in the solids content, in the resistance to water and in the processing time or application reliability are desirable for some applications.

DE-A 4,439,669, DE-A 4,322,242 and JP-A 4,001,245 describe aqueous two-component polyurethane reactive systems based on copolymers, which can be prepared in two stages and from specific monomers. The specific monomers are said to result in improved properties, but the products are considerably more expensive, so that the possibilities of economical use are limited.

In addition to the disadvantages already listed for the polymer dispersions of the prior art, many of these dispersions have a lack of storage stability with regard to viscosity, i.e. the viscosity of the binder dispersion decreases significantly during storage. A remedy can be provided by significantly increasing the acid number of the binder; however, this increases the hydrophilicity of films produced therefrom in an undesirable manner and thus impairs the resistance properties of the coating.

An object of the present invention is to provide a binder dispersion having good storage stability, which has an acid number, based on solids, of <30 mg KOH/g. In addition to good storage stability for the binder, it is also an object of the present invention to provide coating compositions and resulting coatings which possess a high solids content, a high reactivity coupled with a good pot life, good resistance to solvents, water and environmental influences and very good optical properties (gloss) and mechanical properties (hardness, flexibility). It is an additional object of the present invention for the coating compositions to be employed in as many fields of application as possible, which requires good compatibility with as many commercially available crosslinking agents as possible. It is a final object of the present invention to avoid the use of time- and cost-intensive processes, such as distillation steps, in the preparation process.

Surprisingly, these objects may be achieved with the aqueous coating compositions of the present invention, which are described in detail hereinafter. The compositions contain selected copolymers P which have a specific uniform molecular weight distribution and are prepared by a multi-stage process.

SUMMARY OF THE INVENTION

The present invention relates to a hydroxy-functional copolymer P, which is present as a dispersion and/or solution in water, has an acid number, based on solids, of <30 mg KOH/g, and is obtained by successively carrying out process steps A–D:

A) Initially introducing a hydrophobic polymer containing hydroxyl groups into a reaction vessel, B) introducing an initiator component into that vessel, C) subsequently polymerizing a hydrophobic monomer mixture containing hydroxyl groups in that vessel and D) subsequently polymerizing a hydrophilic monomer mixture containing hydroxyl and acid groups in that vessel.

In a preferred embodiment of the present invention, the process is carried out as follows:

A): initially introducing

A1) 0 to 40 wt. %, based on the solids content of copolymer P, of a hydroxy-functional hydrophobic copolymer having an acid number, based on solids, of <10 mg KOH/g, which is not sufficient for dispersing or dissolving copolymer A1) in water, an OH content, based on solids, of 0.5 to 7 wt. %, a number average molecular weight of 1,500 to 20,000 and a content of organic solvents of 0 to 60 wt. %, based on the weight of A1, and A2) 0 to 15 wt. %, based on the solids content of copolymer P, of additional organic solvents,
into a reaction vessel and heating the reaction mixture to the polymerization temperature before, during or after step A, B): metering in 5 to 40 wt. %, based on the weight of B1+C2+D2, of a free-radical initiator B1, optionally dissolved in an organic solvent, C): simultaneously metering in 40 to 80 wt. %, based on the solids content of copolymer P, of a hydrophobic monomer mixture C1 which is substantially free from carboxyl groups and contains
   c1) 30 to 90 wt. % of (meth)acrylic acid esters with $C_1$ to $C_{18}$-hydrocarbon radicals in the alcohol portion, vinylaromatics and/or vinyl esters,
   c2) 10 to 60 wt. % of hydroxy-functional monomers and
   c3) 0 to 2 wt. % of monomers containing acid groups,
      wherein the percentages of c1+c2+c3 add up to 100% and a free-radical initiator C2 in an amount of 25 to 90 wt. %, based on the weight of B1+C2+D2, optionally dissolved in an organic solvent, D): simultaneously metering in 5 to 50 wt. %, based on the solids content of copolymer P, of a hydrophilic monomer mixture D1 containing
   d1) 10 to 70 wt. % of (meth)acrylic acid esters with $C_1$ to $C_{18}$-hydrocarbon radicals in the alcohol portion, vinylaromatics and/or vinyl esters,
   d2) 10 to 70 wt. % of hydroxy-functional monomers and
   d3) 5 to 30 wt. % of acid-functional monomers,
      wherein the percentages of d1+d2+d3 adding up to 100%, and a free-radical initiator D2 in an amount of 5 to 40 wt. %, based on the weight of B1+C2+D2, optionally dissolved in an organic solvent, wherein the total amount of B1+C2+D2, based on the solids content of copolymer P, is 0.8 to 5.0 wt. %.

The present invention also relates to a process for the preparation of copolymers P following the procedure previously set forth and to coating compositions containing these copolymers P and one or more crosslinking agents.

Finally, the present invention relates to a process for coating wood, metal, glass, plastics, mineral substrates and/or textiles with the aqueous coating compositions, including a curing step between room temperature and 80° C.

DETAILED DESCRIPTION OF THE INVENTION

Copolymers P according to the invention have a specific, and in particular, a very uniform molecular weight distribution. Surprisingly, the binder dispersions based on these copolymers have very good storage stability, i.e. minimal viscosity change during storage. They also have a high solids content, outstanding paint properties such as high reactivity, good pot life, good compatibility with many commercially available crosslinking agents, good resistance to solvents, water and environmental influences and very good optical properties of the films (gloss) and mechanical properties (hardness, flexibility).

The specific molecular weight distribution of copolymers P is generated by a specific preparation process in which the following steps are carried out successively: A) initial introduction of a hydrophobic polymer containing hydroxyl groups (optionally dissolved in an organic solvent) into a reaction vessel, B) introduction of an initiator component into that vessel, C) polymerization of a hydrophobic monomer mixture containing hydroxyl groups in that vessel, and D) polymerization of a hydrophilic monomer mixture containing hydroxyl and acid groups in that vessel. In other words: C is polymerized in presence of A and B and D is polymerized in presence of A, B and C, respectively.

This preparation process involves no expensive distillation step or similar time- and cost-intensive processes. By using the preparation process according to the invention, aqueous binder dispersions having a stable viscosity during storage can be obtained, at an acid number, based on resin solids of <30 mg KOH/g.

The hydrophobic copolymer A1 that is initially introduced in process step A is a resin which has a number average molecular weight, $M_n$, of 1,500 to 20,000, preferably 2,000 to 6,000; a hydroxyl group content of 0.5 to 7 wt. %, preferably 1 to 4 wt. %; and an acid number, which is not sufficient for dispersing copolymer A1) by itself in water, of <10 mg KOH/g. Copolymer A1 can be prepared from vinyl monomers M1 which are free from hydroxyl and acid groups, hydroxy-functional vinyl monomers M2 and carboxy-functional monomers M3.

Examples of monomers of group M1 include (meth)acrylic acid esters with $C_1$ to $C_{18}$-hydrocarbon radicals in the alcohol portion (e.g. ethyl acrylate, n-butyl acrylate, iso-butyl acrylate, 2-ethylhexyl acrylate, methyl methacrylate, ethyl methacrylate, butyl methacrylate, 2-ethylhexyl methacrylate), styrene, vinyltoluene, α-methylstyrene, vinyl esters, vinyl monomers containing alkylene oxide units, such as condensation products of (meth)acrylic acid with oligoalkylene oxide monoalkyl ethers, and mixtures of these and other monomers.

Hydroxy-functional monomers M2 include hydroxyethyl methacrylate, hydroxypropyl methacrylate, hydroxyethyl acrylate, hydroxypropyl acrylate, hydroxybutyl acrylate, hydroxybutyl methacrylate or hydroxy monomers containing alkylene oxide units, such as addition products of ethylene oxide, propylene oxide or butylene oxide onto (meth)acrylic acid.

Examples of acid-functional monomers M3 include acrylic acid, methacrylic acid, maleic acid (anhydride) and other carboxyl-functional or anhydride-functional copolymerizable monomers.

Resin A1 is employed in amounts of 0 to 40 wt. %, preferably 10 to 25 wt. %, based on the solids content of copolymer P. It can be present in solvent-free form or, preferably, as a solution in organic solvents, with a solids content of 40 to 100 wt. %. It can optionally be diluted to a suitable viscosity with additional organic solvents A2. Suitable solvents include those known from coatings technology, in particular those which are conventionally employed as cosolvents in aqueous dispersions, such as alcohols, ethers, alcohols containing ether groups, esters, ketones, N-methylpyrrolidone, non-polar hydrocarbons and mixtures thereof. The organic solvents remain in the binder dispersion. No distillation step takes place. In particular, the nature and amount of component A2 is chosen such that a sufficient tank filling level and removal of heat is ensured at the start of the polymerization of part C. A maximum of 15 wt. %, preferably 3 to 10 wt. %, based on the solids content of copolymer P, is employed as component A2.

The initiator component B1 to be added in process step B is selected from organic peroxides, such as di-tert-butyl peroxide or tert-butyl peroxy-2-ethylhexanoate, and azo compounds. B1 can optionally be employed as a solution in an organic solvent, which preferably remains in the finished binder dispersion as a co-solvent. It is essential to the invention that 5 to 40 wt. %, preferably 10 to 25 wt. %, of the total amount of initiator (B1+C2+D2) is initially metered into the reaction vessel as component B1. This is carried out either at the polymerization temperature over a period of 5 to 60 min, preferably 10 to 30 min, or before heating, in which the mixture containing A1, optionally A2 and B1 is kept at the polymerization temperature for 5 to 60 min, preferably 10 to 30 min, before the addition of components C1 and C2 is started.

Hydrophobic monomer mixture C1 and initiator component C2 are then simultaneously metered into the reaction vessel in process step C.

Monomer Mixture C1 Contains c1) 30 to 90 wt. %, preferably 40 to 80 wt. % of monomers M1 and c2) 10 to 60 wt. %, preferably 10 to 30 wt. % of hydroxy-functional monomers M2, and is substantially free from carboxyl groups. However, C1 can also contain c3) 0 to 2 wt. %, preferably 0–1 wt. % of monomers M3 containing acid groups, provided that the acid number is not sufficient for dispersion or solution of the resin obtained by polymerization of C1 in water. Components c1+c2+c3 preferably add up to 100 wt. %.

The total amount of hydrophobic monomer mixture C1 (based on the solids content of copolymer P) is 40 to 80 wt. %, preferably 45 to 70 wt. %.

Initiator component C2 contains peroxide or azo compounds of the type described under B1, optionally as a solution in organic solvents. Preferably, but not necessarily, the same initiator compound as B1 is employed as component C2. C2 is employed in an amount of 25 to 90 wt. %, preferably 50 to 80 wt. %, based on the amount of initiator (B1+C2 +D2).

In process step D hydrophilic monomer mixture D1 and an initiator component D2 are then simultaneously metered into the reaction vessel.

Monomer Mixture D1 Contains d1) 10 to 70 wt. %, preferably 30 to 70 wt. % of monomers M1, d2) 10 to 70 wt. %, preferably 20 to 60 wt. % of hydroxy-functional monomers M2 and d3) 5 to 30 wt. %, preferably 8 to 20 wt. % of monomers M3 containing acid groups, wherein d1+d2+d3 preferably add up to 100 wt. %.

Initiator component D2 contains peroxide or azo compounds of the type described under B1, optionally as a solution in organic solvents. Preferably, but not necessarily, the same initiator compound used as B1 and/or C2 is employed as component D2. D2 is employed in an amount of 5 to 40 wt. %, preferably 10 to 25 wt. %, based on the amount of initiator (B1+C2+D2).

The total amount (B1+C2+D2) of initiator employed is 0.8 to 5.0 wt. %, preferably 1.5 to 3.5 wt. %, based on the solids contain of copolymer P. The polymerization can be carried out at temperatures between room temperature and 200° C., preferably between 50° C., and 150° C.

To prepare copolymer P according to the invention, the metering streams and metering times of monomer and initiator components and the polymerization temperature in the particular process steps are such that the copolymer formed has an average molecular weight, $M_n$, of 3,000 to 7,000, preferably 3,500 to 5,500; an average molecular weight, $M_w$, of 10,000 to 25,000, preferably 11,000 to 20,000; and a molecular weight distribution ($M_w/M_n$) of 2.5 to 4.0, preferably 3.0 to 4.0. A particularly high level of properties is achieved if the values of $M_n$ obtained after process steps C) and D) by using the process according to the invention deviate from one another by less than 1,500, preferably by less than 800, and those of $M_w/M_n$ deviate from one another by less than 1.0, preferably by less than 0.5. Ideally, the polymer chains built up in process step D) have an average molecular weight $M_n$ of 3,000 to 4,500.

The copolymers P includes a mixture of polymer chains built in the process steps A, C and D as well as mixed copolymers of A1 chain segments and the monomer mixtures B1 and/or C 1 or mixed copolymers consisting of B 1 and C 1 monomer mixtures. Such mixed copolymers which are built by radical grafting or transesterification processes are necessary for the stability of the aqueous dispersions of the copolmers P.

The molecular weight distribution is measured by means of gel permeation chromatography in THF, flow rate 1 ml/min, calibrated against polystyrene calibration standards.

It is also essential for the properties of copolymers P and of the aqueous coating compositions formulated therefrom that process steps A)–D) are carried out in conjunction, i.e. the hydrophobic monomer mixture C1 is polymerized in the presence of components A1, optionally A2, and B1 and the hydrophilic monomer mixture D1 is polymerized in the presence of the copolymer prepared up to and including process step C). Other procedures, such as a reversal of the sequence of process steps C) and D) or isolated preparation of individual parts of copolymer P, lead to dispersions of poorer quality.

The OH content, based on solids, of copolymers P is 1 to 8 wt. %, preferably 1.5 to 5.5 wt. %, and is established by the relative amounts of hydroxy-functional monomers M2 employed in process steps C) and D) and by the choice of hydrophobic copolymer A1 employed in process step A). The acid number, based on solids, of copolymer P is 12 to 30, preferably 15 to 25 mg KOH/g, and is established by the relative amounts of acid-functional monomers M3 employed in process steps C) and D) and by the choice of hydrophobic copolymer A1 employed in process step A).

It is essential to the invention that at least 60%, preferably at least 80% of the acid groups introduced into copolymer P are incorporated in process step D). Copolymer P can optionally contain a portion of monomer units, in incorporated form, having hydrophilic alkylene oxide units or may also contain external emulsifiers to provide hydrophilicity, in addition to the acid groups. However, copolymers P are preferably hydrophilically modified only by acid groups.

Copolymers P according to the invention contain 0–30 wt. %, preferably 5–20 wt. % of organic solvents, which remain in the aqueous composition. Suitable solvents include any of the known solvents from coatings technology, in particular those, which are conventionally employed as cosolvents in aqueous dispersions. Examples include alcohols, ethers, alcohols containing ether groups, esters, ketones, N-methylpyrrolidone, non-polar hydrocarbons and mixtures thereof. A solvent mixture containing 30 to 95, preferably 50 to 80 wt. % of a hydrophobic, water-immiscible, non-hydrolyzable solvent i) (such as xylene, toluene, solvent naphtha, technical-grade hydrocarbon mixtures, Isopar solvent, Terapin solvent, white spirit and benzene, and mixtures of these and other hydrophobic solvents), and ii) 5 to 70, preferably 20 to 50 wt. % of water-miscible or water-soluble, non-hydrolyzable solvents (such as butyl glycol, methoxypropanol, butyl diglycol, diethylene glycol, dipropylene glycol, ethyl glycol, propyl glycol, methyl diglycol and mixtures of these and other water-miscible or water-soluble non-hydrolyzable solvents) are preferably employed in copolymers P. Copolymers P are preferably prepared only in organic solvents and in the absence of water.

The nature and amount of organic solvent or solvent mixture employed is such that on the one hand the desired properties of the coating, such as flow, drying or VOC content, are achieved, and on the other hand an adequate tank filling level and removal of heat is ensured at the start of the polymerization of part C.

Organic amines or water-soluble inorganic bases are employed for neutralization of the carboxyl groups polymerized into copolymer P. N-methylmorpholine, triethylamine, dimethylethanolamine, dimethylisopropanolamine and methyldiethanolamine are preferred. Diethylethanolamine, butanolamine, morpholine, 2-aminomethyl-2-methylpropanol and isophoronediamine are also suitable. Ammonia is less suitable, but can also be used. The neutralizing agent is added in an amount sufficient to neutralize 70 to 170%, preferably more than 90 to 170% of the carboxyl groups to the salt form. It has been found that the stability of the dispersion, the stability of the coating composition, the wetting of pigments and the optical properties of the films can be improved significantly at this degree of neutralization.

The pH of the aqueous dispersion is 6.0 to 11.0, preferably 7.0 to 9.0.

The aqueous binder dispersions (i.e., dispersions of copolymers P) have a solids content of 30 to 60 wt. %, preferably 40 to 50 wt. %, and a content of organic solvents of 0 to 15 wt. %, preferably 3 to 10 wt. %. If particularly low solvent contents are necessary, the solvents employed can be removed in part by distillation without impairing the properties of the product.

Copolymers P, which are present as a dispersion and/or solution in water, are employed in or as paint or coating compositions (optionally together with other binders or dispersions, e.g. based on polyesters, polyurethanes, polyethers, polyepoxides or polyacrylates) in combination with crosslinking resins and optionally pigments and other additives known in the paint industry. Such a combination can contain 50 to 95 wt. %, preferably 65 to 90 wt. %, of copolymer P, optionally mixed with other binders or dispersions, and 5 to 50, preferably 10 to 35 wt. %, of a crosslinking resin or mixture of crosslinking resins.

Depending upon the reactivity or optional blocking of the crosslinking agents either one-component paints and two-components coating compositions can be formulated with crosslinking agents. One-component coating compositions in the context of the present invention are understood to be coating compositions in which the binder component and crosslinking agent can be stored together without a crosslinking reaction taking place to an extent which is noticeable or harmful to the later application. The crosslinking reaction takes place only after application and after activation of the crosslinking agent, e.g., by an increase in temperature.

Two-component coating compositions in the context of the present invention are understood to be coating compositions in which the binder component and crosslinking agent component must be stored in separate vessels because of their high reactivity. The two components are mixed only shortly before application and then react without additional activation; however, catalysts can also be employed or higher temperatures applied in order to accelerate the crosslinking reaction.

Suitable crosslinking resins include amide- and amine-formaldehyde resins, phenolic resins, aldehyde and ketone resins, such as phenol-formaldehyde resins, resols, furan resins, urea resins, carbamic acid ester resins, triazine resins, melamine resins, benzoguanamine resins, cyanamide resins and aniline resins. These resins are described in "Lackkunstharze [Synthetic Resins for Paints]", H. Wagner, H. F. Sarx, Carl Hanser Verlag, Munich, 1971.

Also suitable as crosslinking agents are blocked polyisocyanates, for example, those prepared by blocking isophoronediisocyanate, hexamethylene diisocyanate, 1,4-diisocyanatohexane, bis-(4-isocyanatocyclohexane)-methane and 1,3-diisocyanatobenzene; prepared by blocking lacquer polyisocyanates containing biuret or isocyanurate groups and based on 1,6-diisocyanatohexane, isophorone diisocyanate or bis-(4-isocyanatocyclohexane)-methane; and lacquer polyisocyanates which contain urethane groups and are prepared by reacting an excess of 2,4- and/or 2,6-diisocyanatotoluene or isophorone diisocyanate with low molecular weight polyhydroxy compounds, such as trimethylolpropane, the isomeric propanediols or butanediols and mixtures thereof.

Suitable blocking agents for these polyisocyanates include monohydric alcohols such as methanol, ethanol, butanol, hexanol, cyclohexanol and benzyl alcohol; oximes such as acetoxime, methyl ethyl ketoxime and cyclohexanone oxime; lactams such as ε-caprolactam; phenols; amines such as diisopropylamine and dibutylamine; dimethylpyrazole or triazole; and malonic acid dimethyl ester, malonic acid diethyl ester and malonic acid dibutyl ester.

The hydrophilic modification of copolymer component A) is generally sufficient to also ensure the dispersibility of the crosslinker resins, if they are not water soluble or dispersible resins.

Water soluble or dispersible, blocked polyisocyanates are obtained, e.g., by modification with carboxylate and/or with polyethylene oxide groups or polyethylene oxide/polypropylene oxide groups.

Crosslinking resins, which are also suitable are low-viscosity, hydrophobic or hydrophilic polyisocyanates, which have free isocyanate groups and are based on aliphatic, cycloaliphatic, araliphatic and/or aromatic isocyanates. These polyisocyanates in general have a viscosity at 23° C. of 10 to 3,500 mPa.s. If necessary, the polyisocyanates can be employed as a mixture with small amounts of inert solvents to lower the viscosity to a value within this range.

The polyisocyanates may be hydrophilically modified, e.g., by reaction with less then stoichiometric amounts of monohydric, hydrophilic polyether alcohols. The preparation of such hydrophilic polyisocyanates is described, for example, in EP-A 540,985 (U.S. Pat. No. 5,252,696, herein incorporated by reference). The polyisocyanates containing allophanate groups, which are described in German Patent Application 19 822 891.0 (copending application, U.S. Ser. No. 09/312,180, herein incorporated by reference) and are prepared by reaction of low-monomer polyisocyanates with polyethylene oxide polyether alcohols under allophanatization conditions, are also particularly suitable. Hydrophilic modification by the addition of commercially available emulsifiers is also possible.

Mixtures of various crosslinking resins can also be employed.

In a preferred embodiment, mixtures of hydrophilic and low viscosity hydrophobic polyisocyanates in combination with the dispersions according to the invention are employed in aqueous two-component systems, which are reactive at room temperature. Preferred mixtures contain 30 to 90 wt. % of a hydrophilically modified polyisocyanate which is based on hexamethylene diisocyanate and optionally contains allophanate groups and 10 to 70 wt. % of a polyisocyanate which is not hydrophilically modified and is based on hexamethylene diisocyanate, isophorone diisocyanate and/or bis-(4-isocyanatocyclohexyl)-methane. Also suitable are mixtures of 10 to 65 wt. % of a low viscosity polyisocyanate which is not hydrophilically modified, is based on hexamethylene diisocyanate and contains isocyanurate, biuret, allophanate and/or uretdione groups and 35 to 90 wt. % of a hydrophilically modified polyisocyanate which is based on isophorone diisocyanate and optionally contains allophanate groups. In these instances low viscosity means having viscosities of 10 to 1,500 mPa.s/23° C.

Triisocyanatononane can also be employed, by itself or in mixtures, as a crosslinking agent.

In another preferred embodiment, mixtures of optionally hydrophilically modified polyisocyanates with free isocyanate groups and amino crosslinking resins, which preferably contain no free amino groups, are combined with the binder dispersions according to the invention and curing is preferably carried out at temperatures of 60 to 120° C. Such mixtures preferably contain 25 to 68 wt. % of polyisocyanates with free isocyanate groups and 32 to 75 wt. % of amino crosslinker resins.

The conventional additives of paint technology, such as defoaming agents, thickeners, pigments, dispersing auxiliaries, catalysts, skin prevention agents, antisettling agents and emulsifiers, can be added before, during or after the preparation of the aqueous binder combinations by mixing with the individual components, and also in the case of the preparation of coating compositions to be processed as one-component compositions.

The coating compositions according to the invention are suitable for all fields of use in which aqueous paint and coating systems with an increased profile of properties are used, e.g. coating of mineral building material surfaces, painting and sealing of wood and wood-based materials, coating of metallic surfaces (coating of metals), coating and painting of asphalt- or bitumen-containing coverings, painting and sealing of various surfaces of plastic (coating of plastics) and high gloss paints.

The paints or coating compositions prepared using the binder combinations according to the invention are suitable for use as primers, fillers, pigmented or transparent top coats, clear paints and high gloss paints, as well as one-coat paints, which can be applied individually or in series, e.g., in the field of industrial painting and for initial and repair painting of automobiles.

Preferred uses of copolymers P are, in combination with polyisocyanates, and more preferably in combination with mixtures of hydrophilic and hydrophobic polyisocyanates, for coating or painting of metallic surfaces or plastics at temperatures from room temperature up to 140° C., or in combination with amino crosslinking resins for coating and painting of metallic surfaces at 110 to 180° C., in the form of one-coat paints or as top coats.

The coating compositions can be applied by various spraying processes, such as compressed air, airless or electrostatic spraying processes, using one- or optionally two-component spraying equipment. However, the paints and coating compositions to be prepared and used according to the invention can also be applied by other methods, for example, by brushing, rolling or knife-coating.

The invention is further illustrated but is not intended to be limited by the following examples in which all parts and percentages are by weight unless otherwise specified.

EXAMPLES

Viscosity measurements were made in a ball-plate viscometer in accordance with DIN 53019 at a shear gradient of 40 $s^{-1}$. The GPC measurements were made on a column combination of Macherey & Nagel, filled with partly crosslinked polystyrene/divinylbenzene gel (Nucleogel):

1. (Precolumn) Nucleogel GPC 10P, 10 $\mu$m, 50×7.7 mm
2. Nucleogel GPC 106-10, 10 $\mu$m, 300×7.7 mm
3. Nucleogel GPC 104-10, 10 $\mu$m, 300×7.7 mm
4. Nucleogel GPC 500-10, 10 $\mu$m, 300×7.7 mm
5. Nucleogel GPC 100-10, 10 $\mu$m, 300×7.7 mm Further Hardware Components Column oven: Merck L 7360;

Pump, injector: Hewlett Packard 1050 series II;

Detectors: DAD Hewlett Packard 1050+RI detector Hewlett

Packard 1047 A

The mobile phase was THF with a flow rate of 0.6 ml/min under a pressure of approx. 65 bar; the measurement temperature was 30° C. 100 $\mu$l of sample with a polymer concentration of approx. 5.0 g/l were injected. Calibration was effected with polystyrene calibration standards of narrow distribution from Polymer-Standard-Service GmbH (PSS) of the corresponding molecular weight range.

Example 1

According to the Invention 515 g of a hydrophobic polyacrylate resin (Desmophen® A 160, Bayer AG, DE), as a 60% solution in solvent naphtha 100, with an OH content (based on solids) of 2.6%, an acid number (based on solids) of 5 mg KOH/g, an average molecular weight, $M_n$, of 4,800 and a polydispersity ($M_w/M_n$) of 2.9, were initially introduced into a 6 l reaction vessel with a stirring, cooling and heating device together with 172 g n-butoxypropanol (A2) and the mixture was heated up to 138° C. A solution (B1) of 8 g di-tert-butyl peroxide in 8 g n-butoxypropanol was added at this temperature in the course of 20 min. Thereafter, a monomer mixture (C1) of 762 g methyl methacrylate, 355 g butyl methacrylate, 52 g butyl acrylate and 507 g hydroxyethyl methacrylate and simultaneously a solution (C2) of 32.5 g di-tert-butyl peroxide in 35 g n-butoxypropanol were metered at this temperature in the course of 4 hours, 30 min. The mixture was kept at 138° C. for 30 min and a mixture (D1) of 128 g methyl methacrylate, 100 g butyl acrylate, 180 g hydroxyethyl methacrylate and 60 g acrylic acid and simultaneously a solution (D2) of 8 g di-tert-butyl peroxide in 20 g n-butoxypropanol were then metered in over a period of 90 min. After stirring at 138° C. for a further hour, the mixture was cooled to 90° C., 78 g dimethylethanolamine were added and the mixture was homogenized and dispersed in 2,400 g water. The resulting copolymer P was present as a dispersion in water and had an OH content (based on solids) of 3.9%, an acid number (based on solids) of 20 mg KOH/g, a solids content of 47% and a viscosity (freshly prepared) of approx. 1,500 mPa.s (23° C., shear gradient 40 $s^{-1}$). The pH (10% in water) was 8.4 and the degree of neutralization was 105%. The dispersion was easily filtered and had an average particle size of approx. 200 nm. After storage at room temperature for 6 weeks, the viscosity of the dispersion was 1,200 mPa.s.

Example 2

According to the Invention

Example 1 was repeated with the exception that a mixture of 438 g methyl methacrylate, 410 g butyl methacrylate, 437 g isobutyl methacrylate and 390 g hydroxyethyl methacrylate was metered in as monomer mixture C1. The amount of water necessary for dispersing and establishing the viscosity in this case was approx. 2,600 g. The resulting copolymer P was present as a dispersion in water and had an OH content (based on solids) of 3.3%, an acid number (based on solids) of 21 mg KOH/g, a solids content of 45% and a viscosity (freshly prepared) of approx. 1,450 mpa.s (23° C., shear gradient 40 $s^{-1}$). The pH (10% in water) was 8.3 and the degree of neutralization was 105%. The dispersion had an average particle size of approx. 170 nm. After storage at room temperature for 6 weeks, the viscosity of the dispersion was 1,100 mPa.s.

Example 3

According to the Invention

Example 1 was repeated with the exception that a mixture of 135 g methyl methacrylate, 525 g butyl methacrylate, 625 g isobornyl methacrylate and 390 g hydroxyethyl methacrylate was metered in as monomer mixture C1. The amount of water necessary for dispersing and establishing the viscosity in this case was approx. 2,900 g. The resulting copolymer P was present as a dispersion in water and had an OH content (based on solids) of 3.3%, an acid number (based on solids) of 21 mg KOH/g, a solids content of 43% and a viscosity (freshly prepared) of approx. 1,400 mPa.s (23° C., shear gradient 40 $s^{-1}$). The pH (10% in water) was 8.3 and the degree of neutralization was 105%. The dispersion had an average particle size of approx. 160 nm. After storage at room temperature for 6 weeks, the viscosity of the dispersion was 1,050 mPa.s.

Example 4

According to the Invention 515 g of the hydrophobic polyacrylate resin from Example 1 were initially introduced into a 6 l reaction vessel with a stirring, cooling and heating device together with a mixture (A2) of 88 g butyl glycol and 94 g solvent naphtha 100 and the mixture was heated up to 143° C. A solution (B1) of 9 g di-tert-butyl peroxide in 9 g solvent naphtha 100 was added at this temperature in the course of 20 min. Thereafter, a monomer mixture (C1) of 234 g methyl methacrylate, 295 g butyl methacrylate, 544 g butyl acrylate and 698 g hydroxypropyl methacrylate and simultaneously a solution (C2) of 35 g di-tert-butyl peroxide in 35 g solvent naphtha 100 were metered at this temperature in the course of 4 hours, 30 min. The mixture was kept at 143° C. for 30 min and a mixture (D1) of 113 g butyl acrylate, 187 g hydroxypropyl methacrylate and 68 g acrylic acid and simultaneously a solution (D2) of 9 g di-tert-butyl peroxide in 9 g solvent naphtha 100 were then metered in over a period of 90 min. After stirring at 143° C. for a further hour, the mixture was cooled to 90° C., 83 g dimethylethanolamine were added and the mixture was homogenized and dispersed in 2,400 g water. The resulting copolymer P was present as a dispersion in water and had an OH content (based on solids) of 4.5%, an acid number (based on solids) of 24 mg KOH/g, a solids content of 46% and a viscosity (freshly prepared) of approx. 1,700 mpa.s (23° C., shear gradient 40 $s^{-1}$). The pH (10% in water) was 8.5 and the degree of neutralization was 100%. The dispersion was easily filtered and had an average particle size of approx. 115 nm. After storage at room temperature for 6 weeks, the viscosity of the dispersion was 1,530 mpa.s.

Example 5

According to the Invention 515 g of the hydrophobic polyacrylate resin from Example 1 were initially introduced into a 6 l reaction vessel with a stirring, cooling and heating device together with 172 g of butyl glycol and the mixture was heated up to 138° C. A solution of 8 g di-tert-butyl peroxide in 8 g butyl glycol was added at this temperature in the course of 20 min. Thereafter, a mixture of 678 g methyl methacrylate, 106 g styrene, 503 g butyl acrylate and 390 g hydroxyethyl methacrylate and simultaneously a solution of 32.5 g di-tert-butyl peroxide in 35 g butyl glycol were metered at this temperature in the course of 4 h. The mixture was kept at 138° C. for 30 min and a mixture of 128 g methyl methacrylate, 100 g butyl acrylate, 180 g hydroxyethyl methacrylate and 58 g acrylic acid and simultaneously a solution of 8 g di-tert-butyl peroxide in 20 g butyl glycol were then metered in over a period of 90 min. After stirring at 138° C. for a further hour, the mixture was cooled to 90° C., 78 g dimethylethanolamine were added and the mixture was homogenized and dispersed in 2,300 g water. The resulting copolymer P was present as a dispersion in water and had an OH content (based on solids) of 3.3%, an acid number (based on solids) of 20 mg KOH/g, a solids content of 47% and a viscosity (freshly prepared) of approx. 1,500 mPa.s (23° C., shear gradient 40 $s^{-1}$) was obtained. The pH (10% in water) was 8.5 and the degree of neutralization was 105%. The dispersion was easily filtered and had an average particle size of approx. 120 nm. After storage at room temperature for 6 weeks, the viscosity of the dispersion was 1,270 mpa.s.

Example 6

Comparison 515 g of the hydrophobic polyacrylate resin from Example 1 were initially introduced into a 6 l reaction vessel with a stirring, cooling and heating device together with 156 g butyl glycol and the mixture was heated up to 138° C. A mixture of 756 g methyl methacrylate, 500 g butyl acrylate and 390 g hydroxyethyl methacrylate was first metered in at this temperature in the course of 3 h and, after the temperature has been maintained for 30 min, a mixture of 127 g methyl methacrylate, 100 butyl acrylate, 180 g hydroxyethyl methacrylate and 58 g acrylic acid was thereafter metered in over a further 90 min. Simultaneously with the metering of the monomers, a solution of 80 g di-tert-butyl peroxide in 80 g butyl glycol was added at a rate such that the peroxide metering was concluded 40 min after the monomer metering had ended; the peroxide metering was also interrupted during the 30-minute metering pause between the monomer streams. When the monomer and peroxide addition had ended, the mixture was stirred at 138° C. for a further 2 h and cooled to 90° C., 78 g dimethylethanolamine were added and the mixture was homogenized and dispersed in 2,600 g of water. The resulting aqueous copolymer dispersion had an OH content (based on solids) of 3.3%, an acid number (based on solids) of 20 mg KOH/g, a solids content of 45% and a viscosity (freshly prepared) of approx. 1,500 mpa.s (23° C., shear gradient 40 s$^{-1}$). The pH (10% in water) was 8.5 and the degree of neutralization was 105%. The dispersion was easily filtered and had an average particle size of approx. 140 nm. After storage at room temperature for 6 weeks, the viscosity of the dispersion was 680 mPa.s.

Example 7

Comparison 186 g butyl glycol and 186 g solvent naphtha were weighed into a 6 I reaction vessel with a stirring, cooling and heating device and were heated to 143° C. A mixture I) of 750 g methyl methacrylate, 125 g styrene, 445 g hydroxyethyl methacrylate, 538 g butyl acrylate and 87 g butyl methacrylate was then metered in over a period of 3 hours, and directly thereafter a mixture II) of 128 g methyl methacrylate, 180 g hydroxyethyl methacrylate, 100 g butyl acrylate and 60 g acrylic acid was metered in over a period of 1½ hours. Simultaneously with the addition of the monomers 88 g di-tert-butyl peroxide in 70 g of a 1:1 mixture of butyl glycol and solvent naphtha were metered in over a period of 5 hours. After the mixture had been stirred at 145° C. for a further 2 hours, it was cooled to 100° C., 76 g dimethylethanolamine were added and the mixture was homogenized and dispersed in 2,700 g water. The resulting copolymer was present as a dispersion in water and had an OH content (based on solids) of 3.3%, an acid number (based on solids) of 21 mg KOH/g, a solids content of 44% and a viscosity (freshly prepared) of approx. 800 mpa.s (23° C., shear gradient 40 s$^{-1}$). The pH (10% in water) was 8.1 and the degree of neutralization was 105%. The dispersion was easily filtered and had an average particle size of approx. 105 nm. After storage at room temperature for 6 weeks, the viscosity of the dispersion was 360 mPa.s.

Example 8

Comparison

Example 9 was repeated with the exception that the mixture was dispersed in only approx. 2,600 g water. The resulting dispersion had an OH content (based on solids) of 3.3%, an acid number (based on solids) of 21 mg KOH/g, a solids content of approx. 45% and a viscosity (freshly prepared) of approx. 1,500 mPa.s (23° C., shear gradient 40 s$^{-1}$). The pH (10% in water) was 8.1 and the degree of neutralization was 105%. The dispersion was easily filtered and had an average particle size of approx. 110 nm. After storage at room temperature for 6 weeks, the viscosity of the dispersion was 600 mpa.s.

Example 9

Comparison Corresponds to Example A1 from EP A 358,979 (U.S. Pat. No. 5,075,370)

900 g butyl acetate were initially introduced into a 4 I reaction vessel with a stirring, cooling and heating device and were heated to 110° C. A mixture of 381 g methyl methacrylate, 459 g hydroxyethyl methacrylate, 450 g butyl acrylate, 150 g acrylic acid and 50 g azoisobutyronitrile was then metered in uniformly in the course of 4 hours. The mixture was kept at 110° C. for 30 min and 10 g tert-butyl peroctoate in 110 g butyl acetate were then added. After the mixture had been subsequently stirred at 110° C. for a further 6 hours, approx. 100 ml butyl acetate were distilled off under 200 to 400 mbar; the amount distilled off was replaced by fresh butyl acetate.

A solution, heated to 95° C., of 143 g of a 25% ammonia solution in 3,500 g dist. water was then initially introduced into a 6 I reaction vessel with a stirring, cooling and heating device and distillation bridge. The polymer solution was then allowed to run into the aqueous ammonia solution in the course of one hour and the butyl acetate was distilled off azeotropically. The amount of water distilled off with the butyl acetate was replaced continuously. The resulting copolymer was present as a dispersion in water and has an OH content (based on solids) of 4.0%, an acid number (based on solids) of 90 mg KOH/g, a solids content of 28% and a viscosity (freshly prepared) of approx. 2,000 mpa.s (23° C., shear gradient 40 s$^{-1}$). The pH (10% in water) was 6.4 and the degree of neutralization was 101%. The dispersion had an average particle size of approx. 30 nm. After storage at room temperature for 6 weeks, the viscosity of the dispersion had risen to 3,100 mPa.s.

Example 10

Comparison, Corresponds to Example P6 from EP-A 365 775

500 g butyl glycol were weighed into a 6 I reaction vessel with a stirring, cooling and heating device and were heated to 140° C. A mixture of 750 g methyl methacrylate, 575 g hydroxypropyl acrylate, 550 g butyl acrylate and 500 g butyl methacrylate was then metered in over a period of 3 hours 50 min and, directly thereafter, 125 g acrylic acid were metered in over a period of 20 min. Simultaneously with the addition of the monomers a solution of 112.5 g tert-butyl perbenzoate in 125 g butyl glycol was metered in over a period of 4 hours 30 min. When the addition of the initiator solution had ended, the mixture was stirred at 140° C. for a further hour; it was then cooled to 95° C., 124 g dimethylethanolamine were added and the mixture was homogenized and dispersed in 2,900 g water. The resulting copolymer was present as a dispersion in water and had an OH content (based on solids) of 3.0%, an acid number (based on solids) of 39 mg KOH/g, a solids content of 43% and a viscosity (freshly prepared) of approx. 1,600 mPa.s (23° C., shear gradient 40 s$^{-1}$) was obtained. The pH (10% in water) was 7.4 and the degree of neutralization was 80%. The dispersion had an average particle size of approx. 135 nm. With a content of 10.3% of butyl glycol, the dispersion had a very high content of organic co-solvent. After storage at room temperature for 6 weeks, the viscosity of the dispersion was 1,270 mPa.s.

Example 11

Comparison, Corresponds to Example P2 from EP-A 363 723

500 g butyl glycol were weighed into a 6 I reaction vessel with a stirring, cooling and heating device and were heated to 140° C. A mixture of 187 g methyl methacrylate, 187 g styrene, 288 g hydroxypropyl acrylate, 275 g butyl acrylate and 250 g butyl methacrylate was then metered in over a period of 1 hour, 53 min and, directly thereafter, 62.5 g acrylic acid were metered in over a period of 7 min. A mixture of 187 g methyl methacrylate, 187 g styrene, 288 g hydroxypropyl acrylate, 275 g butyl acrylate and 250 g butyl methacrylate was then again metered in over a period of 1 hour 52 min and, directly thereafter, 62.5 g acrylic acid were metered in over a period of 8 min. Simultaneously with the addition of the monomers a solution of 112.5 g tert-butyl perbenzoate in 125 g butyl glycol was metered in over a period of 4 hours, 30 min. When the addition of the initiator solution had ended, the mixture was stirred at 140° C. for a further hour; it was then cooled to 95° C., 124 g of dimethylethanolamine were added and the mixture was homogenized and dispersed in 2,950 g water. The resulting copolymer was present as a dispersion in water and had an OH content (based on solids) of 3.0%, an acid number (based on solids) of 40 mg KOH/g, a solids content of 42% and a viscosity (freshly prepared) of approx. 1,400 mPa.s (23° C., shear gradient 40 s$^{-1}$). The pH (10% in water) was 7.7 and the degree of neutralization was 80%. The dispersion had an average particle size of approx. 190 nm. With a content of 10.1 % of butyl glycol, the dispersion had a very high content of organic co-solvent. After storage at room temperature for approx. 4 weeks, the dispersion showed phase separation.

Example 12

Comparison, Corresponds to Example A2 from DE-A 4,322,242

480 g ethoxyethyl propionate and 200 g glycidyl ester of versatic acid (Cardura E 10, Shell Chem.) were weighed into a 6 l reaction vessel with a stirring, cooling and heating device and the mixture was heated to 120° C. A mixture of 160 g methyl methacrylate, 154 g styrene, 220 g hydroxyethyl methacrylate, 100 g 2-ethylhexyl acrylate and 200 g butyl methacrylate was then metered in over a period of 2 hours and, directly thereafter, a mixture of 160 g methyl methacrylate, 154 g styrene, 220 g hydroxyethyl methacrylate, 100 g 2-ethylhexyl acrylate, 200 g butyl methacrylate and 132 g acrylic acid was metered in over a period of 2 hours. Simultaneously with the addition of the monomers 245 g of a 49% solution of tert-butyl per(ethyl-hexanoate) in butyl acetate were metered in over a period of 4 hours 30 min. When the addition of the initiator solution had ended, the mixture was stirred at 120° C. for a further 90 min. It was then cooled to 80° C., 55 g dimethylethanolamine were added in the course of 30 min and the mixture was homogenized and dispersed with 2,700 g water. The organic solvent was substantially distilled off azeotropically from this dispersion under vacuum; a residual content of 6% was detected by GC. The water, which has been distilled off, was recycled. The resulting copolymer was present as a dispersion in water and had an OH content (based on solids) of 3.5%, an acid number (based on solids) of 33 mg KOH/g, a solids content of 46% and a viscosity (freshly prepared) of approx. 1,300 mPa.s (23° C., shear gradient 40 s$^{-1}$). The pH (10% in water) was 7.8 and the degree of neutralization was 60%. The dispersion had an average particle size of approx. 200 nm. The dispersion showed phase separation after storage for 3 weeks at room temperature.

The following crosslinking resins were used as hardeners in the use examples, all the additives used in the preparations can be exchanged by similar types of agents having the same principal funktion.

Polyisocyanate H1

A low viscosity hydrophobic polyisocyanate containing isocyanurate groups and based on hexamethylene diisocyanate, viscosity at 23° C. approx. 1,200 mPa.s, NCO content: approx. 23.5% (Desmodur® N 3600, Bayer AG, DE)

Polyisocyanate H2

A hydrophilized polyisocyanate containing isocyanurate groups and based on hexamethylene diisocyanate, viscosity at 23° C.: approx. 3,500 mPa.s, NCO content: approx. 17% (Bayhydur® 3100, Bayer AG, DE)

Amino Crosslinking Resin H3

A commercially available melamine resin (Cymel 327, Cytec)

Polyisocyanate H4

A 40% aqueous dispersion of a blocked polyisocyanate crosslinking agent (Bayhydur® BL 5140, Bayer AG, DE)

Use Example 1

Preparation of a Pigmented Top Coat (Table 1)

220 g of the binder dispersion from Example 1, 5 g of a customary surfactant (e.g. Surfynol® 104, Air Products), 30 g dist. water and 186 g titanium dioxide (Bayertitan® R-KB-4, Bayer) were ground in a vibrator. 150 g of the ground material thus obtained were mixed with 34 g of the dispersion from example 1, 0.44 g of a customary substrate wetting agent, (e.g. Byk® 346 (Byk Chemie)), 0.67 g of a customary levelling agent (e.g. Byk® 380 (Byk Chemie)), 1.2 g of a customary thickener (e.g. Acrysol® RM8 (20% in ethanol, Rohm & Haas)), 15.9 g polyisocyanate H1 and 21.7 g polyisocyanate H2 in a dissolver and the mixture was adjusted to a viscosity of approx. 30 seconds at 23° C. in a DIN 4 flow cup with approx. 38 g dist. water. The solids content of the coating composition was 54% and the pH was 8.2. The NCO:OH equivalent ratio was 1.5:1. After application to a degreased steel sheet, the coating was dried at room temperature. A high gloss hard coating was obtained. The properties and test results are set forth in table 1.

Use Examples 2–4 and Comp. 5–Comp. 9

Preparation of Pigmented Top Coats (Table 1)

Use example 1 was repeated with the exception that the binder dispersions set forth in table 1 were used in the coating composition. The NCO:OH equivalent ratio was in each case adjusted to 1.5:1, and the viscosity to 30 seconds/DIN 4 cup.

TABLE 1

Properties of the aqueous two-component polyurethane white coating compositions with hardener combination H1/H2; dried at room temperature.

| Use ex. | 1 | 2 | 3 | 4 | Comp. 5 | Comp. 6 | Comp. 7 | Comp. 8 | Comp. 9 |
|---|---|---|---|---|---|---|---|---|---|
| Binder ex. | 1 | 2 | 3 | 5 | 6 | 7 | 8 | 9 | 12 |
| $M_n$ binder | 4500 | 6300 | 5300 | 4200 | 4200 | 3600 | 3600 | 1800 | 3200 |
| $M_w$ binder | 15500 | 18600 | 16300 | 14800 | 23100 | 21600 | 21600 | 11800 | 11400 |

TABLE 1-continued

Properties of the aqueous two-component polyurethane white coating compositions with hardener combination H1/H2; dried at room temperature.

| Use ex. | 1 | 2 | 3 | 4 | Comp. 5 | Comp. 6 | Comp. 7 | Comp. 8 | Comp. 9 |
|---|---|---|---|---|---|---|---|---|---|
| $M_w/M_n$ | 3.4 | 2.9 | 3.0 | 3.5 | 5.5 | 6.0 | 6.0 | 6.5 | 3.6 |
| Acid number binder | 20 | 21 | 21 | 21 | 22 | 21 | 21 | 90 | 33 |
| Viscosity drift* | 80 | 75 | 75 | 85 | 45 | 45 | 40 | >100 | phase separation |
| Gloss (60°) | 88 | 87 | 80 | 89 | 88 | 87 | 87 | 88 | 80 |
| Drying [h] dust-free/non-tacky | 1/5 | 0.5/6 | 0.5/5 | 2/≧7 | 2/≧7 | 2.5/≧7 | 2.5/≧7 | 1.5/≧7 | 2/≧7 |
| Pendulum hardness[s] | 147 | 127 | 151 | 90 | 90 | 86 | 86 | 70 | 125 |
| Resistance to water** | 1 | 1 | 1 | 1 | 1 | 1 | 1 | 3 | 1 |
| Solvent res. acetone/xylene*** | 1/0 | 1/0 | 1/0 | 2/1 | 2/1 | 2/1 | 2/1 | 4/1 | 4/3 |

*: Decrease in the viscosity of the binder dispersion after storage for 6 weeks at room temperature as % of the starting viscosity
**: Maintaining gloss during storage in water: 0 = no loss in gloss; 5 = severe loss in gloss
***: Exposure for 5 min: 0 = no damage; 5 = paint detached It can be seen from table 1 that use examples 1–4 according to the invention have very good coating properties in combination with good storage stability of the binder dispersion. In comparison examples 5–7 the polydispersity of ≈6 was significantly higher and the viscosity of the binder dispersions decreased sharply during storage. In comparison example 8 the binder dispersion also had a high acid number in addition to a broad molecular weight distribution. Although there was no decrease in the binder viscosity in this example, there were disadvantages in the resistance to water and the solvent resistance of the coating. The dispersion employed in use example 9 had an acceptable polydispersity, even though the dispersion was not prepared by the process according to the invention. The acid number of 33 was above the range required by the invention; nevertheless, it was not sufficient to stabilize the dispersion. After a short storage time, the dispersion showed phase separation. Furthermore, paint films produced according to comp. example 9 had poor resistance to solvents.

Use Examples 10–12 and Comp. 13 and 14

Preparation of Pigmented Top Paints (Table 2)

Use example 1 was repeated with the exception that the binder dispersions set forth in table 2 were used to prepare the coating compositions and the coatings were force-dried at 80° C. for 30 minutes instead of at room temperature. The NCO:OH equivalent ratio was adjusted to 1.5:1 in each case and the viscosity to 30 seconds/DIN 4 cup.

It can be seen from table 2 that use examples 9–12 according to the invention have very good coating properties in combination with good storage stability of the binder dispersion. The polydispersity of 3.2 in comparison examples 13 and 14, which were not prepared according to the invention was within the range of the dispersions according to the invention; however, the dispersions of these comparison examples were not prepared by the process according to the invention and their acid numbers were above the range permitted according to the invention. In both comparison examples, coatings of significantly lower hardness and solvent resistance were obtained compared with use examples 9–12 according to the invention. The coatings from comp. example 13 also showed significant disadvantages in resistance to water, while the coatings from comp. example 14 were not storage stable and separated into two phases after a short storage time.

TABLE 2

Characteristic data and properties of the aqueous two-component polyurethane white coating compositions with hardener combination H1/H2; forced dried (30 min 80° C.)

| Use ex. | 9 | 10 | 11 | 12 | Comp. 13 | Comp. 14 |
|---|---|---|---|---|---|---|
| Binder ex. | 1 | 2 | 3 | 5 | 10 | 11 |
| $M_n$ binder | 4500 | 6300 | 5300 | 4200 | 3500 | 3800 |
| $M_w$ binder | 15500 | 18600 | 16300 | 14800 | 11200 | 12000 |
| $M_w/M_n$ | 3.4 | 2.9 | 3.0 | 3.5 | 3.2 | 3.2 |
| Acid number binder | 20 | 21 | 21 | 21 | 39 | 40 |
| Viscosity drift* | 80 | 75 | 75 | 85 | 80 | phase separation |
| Gloss (60°) | 88 | 87 | 87 | 88 | 87 | 89 |
| Pendulum hardness[s] | 172 | 170 | 179 | 150 | 63 | 97 |
| Resistance to water** | 0 | 0 | 0 | 0 | 3 | 0 |
| Solvent res. acetone/xylene*** | 1/0 | 1/0 | 1/0 | 2/0 | 3/2 | 3/1 |

*: Decrease in the viscosity of the binder dispersion after storage for 6 weeks at room temperature as % of the starting viscosity
**: Maintaining gloss during storage in water: 0 = no loss in gloss; 5 = severe loss in gloss
***: Exposure for 5 min: 0 = no damage; 5 = paint detached Use Example 16

Preparation of a Pigmented Top Coat 220 g of the binder dispersion from example 5, 5 g surfactant (Surfynol® 104, Air Products), 30 g dist. water and 186 g titanium dioxide (Bayertitan® R-KB-4, Bayer)

were ground in a vibrator. 150 g of the ground material thus obtained were mixed with 28 g of the dispersion from example 5, 0.44 g Byk® 346 (Byk Chemie), 0.66 g Byk® 380 (Byk Chemie), 1.2 g Acrysol® RM8 (20% in ethanol, Rohm & Haas) and 41.1 g polyisocyanate H2 in a dissolver. The mixture was adjusted to a viscosity of approx. 30 seconds at 23° C. in a DIN 4 flow cup with approx. 29 g dist. water. The solids content of the coating composition was 54% and the pH was 8.2. The NCO:OH equivalent ratio was 1.5:1. After application to a degreased steel sheet, the coating was dried at room temperature. A high gloss hard coating which had good resistance to solvents and water was obtained. The resistance level of the coating can be further improved to very good values by forced drying.

Use Example 17

Preparation of a Pigmented Top Coat 351 g of the binder dispersion from example 5, 8 g surfactant (Surfynol® 104, Air Products), 48 g water and 297 g titanium dioxide (Bayertitan® R-KB-4, Bayer) were ground in a vibrator. The ground material thus obtained was mixed with 177 g of the dispersion from example 5, 66 g amino crosslinking resin H3, 6.3 g Acrysol® RM8 (20% in ethanol, Rohm & Haas) and 10.5 g defoamer Byk® 011 (Byk Chemie). The mixture was adjusted to a viscosity of approx. 30 seconds at 23° C. in a DIN 4 flow cup with water. The solids content of the coating composition was 56% and the storage stability of the paint was >6 months. After application to a degreased steel sheet, the coating was stoved for 10 minutes at 160° C.; the dry film thickness was approx. 35 $\mu$m. A hard coating (pendulum hardness 170 sec) having a high gloss and good solvent resistance was obtained.

Use Example 18

Preparation of a Pigmented Top Coat 230 g of the binder dispersion from example 5, 7.35 g of a 20% solution of dimethylethanolamine in water, 41 g water and 184 g titanium dioxide (Bayertitan® R-KB-4, Bayer) were ground in a vibrator. The ground material thus obtained was mixed with 17.5 g of the binder dispersion from example 5, 66.5 g crosslinker resin H4, 4.9 g of levelling agent Lancoflow® W (25%w/w in water; Lubrizol), 4.4 g NMP and 2.3 g of a 20% solution of dimethylethanolamine in water. The mixture was adjusted to a viscosity of approx. 30 seconds at 23° C. in a DIN 4 flow cup. The solids content of the coating composition was approx. 48%; the pH was 9.2. After application to a degreased steel sheet, the coating was stoved at 150° C. for 30 minutes, the dry film thickness being approx. 35 $\mu$m. A hard paint coating (pendulum hardness 175 sec) with a high gloss and good resistance to solvents was obtained.

Example 19

Preparation of a Top Coat 378 g of the binder dispersion from example 4 were mixed with 12.2 g of light stabilizer/UV-absorber Tinuvin® 1130 (50% in butyl glycol acetate, Ciba Geigy), 6.1 g of light stabilizer/UV-absorber Tinuvin® 292 (50% in butyl glycol acetate, Ciba Geigy), 3.1 g Baysilon® OL 44 (10% in butyl glycol acetate, Bayer), 62.1 g butyl diglycol acetate and 111.9 g dist. water (component A). Hardener component B), which contained 127 g polyisocyanate crosslinking agent H1, was incorporated into component A) by means of jet stream dispersion. The reactive two-component polyurethane composition had a solids content of 45%, and the NCO:OH equivalent ratio was approx. 1.5:1. The pot life was >6 hours and the viscosity remained approximately constant in this period of time.

The clear paint was applied to an aluminum sheet coated with a base paint or to a glass plate by spraying and the solvent was evaporated off in air for 5 minutes at room temperature. After pre-drying for 10 minutes at 80° C., the coating was cured at 130° C. for 30 minutes. A clear, high gloss coating was obtained; gloss (20° C.)=85. The film had a very high pendulum hardness of 203 sec, a very good solvent resistance to xylene, methoxypropyl acetate, ethyl acetate and acetone and a good resistance to water, dilute sulphuric acid and dilute sodium hydroxide solution.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An aqueous coating composition comprising at least one hydroxy-functional copolymer P, which is present as a dispersion and/or solution in water and has an acid number, based on resin solids, of <30 mg KOH/g, and one or more crosslinking resins, wherein copolymer P is obtained by successively carrying out process steps A–D:

A): initially introducing
A1) 0 to 40 wt. %, based on the solids content of copolymer P, of a hydroxy-functional hydrophobic copolymer having an acid number, based on solids, of <10 mg KOH/g, which is not sufficient for dispersing or dissolving A1 in water, an OH content, based on solids, of 0.5 to 7 wt. %, a number average molecular weight of 1,500 to 20,000 and a content of organic solvents of 0 to 60 wt. %, based on the weight of A1, and
A2) 0 to 15 wt. %, based on the solids content of copolymer P, of additional organic solvents,
into a reaction vessel and heating the reaction mixture to the polymerization temperature before, during or after step A, B): metering in 5 to 40 wt. %, based on the weight of B1+C2+D2, of a free-radical initiator B1, optionally dissolved in an organic solvent, C): simultaneously metering in 40 to 80 wt. %, based on the solids content of copolymer P, of a hydrophobic monomer mixture C1 which is substantially e from carboxyl groups and comprises
c1) 30 to 90 wt. % of (meth)acrylic acid esters with $C_1$ to $C_{18}$-hydrocarbon radicals in the alcohol portion, vinylaromatics and/or vinyl esters,
c2) 10 to 60 wt. % of hydroxy-functional monomers and
c3) 0 to 2 wt. % of monomers containing acid groups, wherein the percentages of c1+c2+c3 adds up to 100% and a free-radical initiator C2 in amount of 25 to 90 wt. %, based on the weight of B1 +C2+D2, optionally dissolved in an organic solvent, and D): simultaneously metering in 5 to 50 wt. %, based on the solids content of copolymer P, of a hydrophilic monomer mixture D1 comprising
d1) 10 to 70 wt. % of (meth)acrylic acid esters with $C_1$ to $C_{18}$-hydrocarbon radicals in the alcohol portion and/or vinylaromatics and/or vinyl esters, d2) 10 to 70 wt. % of hydroxy-functional monomers and d3) 5 to 30 wt. % of acid-functional monomers, wherein the percentages of d1+d2+d3 adding up to 100%, and a free-radical initiator D2 in an amount of 5 to 40 wt. %, based on the weight of B1+C2+D2, optionally dissolved in an organic solvent, wherein the total amount of B1+C2+D2, based on the solids content of copolymer P, is 0.8 to 5.0 wt. %.

2. The aqueous coating composition of claim 1 wherein said crosslinking resins have free isocyanate groups.

3. The aqueous coating composition of claim 1 wherein said crosslinking resins comprise hydrophilically modified crosslinking resins components with free isocyanate groups.

4. The aqueous coating composition of claim 1 wherein said crosslinking resins have blocked isocyanate groups.

5. The aqueous coating composition of claim 1 wherein said crosslinking resins comprise hydrophilically modified crosslinking resins having blocked isocyanate groups.

6. The aqueous coating composition of claim 1 wherein said crosslinking resins comprise aminoplast resins.

7. The aqueous coating composition of claim 1 wherein said crosslinking resins comprise at least 2 crosslinking agent components selected from the group consisting of hydrophilically modified polyisocyanate crosslinking resins with free NCO groups, hydrophobic polyisocyanate crosslinking resins with free NCO groups, hydrophilically modified blocked polyisocyanate crosslinking resins, hydrophobic blocked polyisocyanate crosslinking resins and aminoplast resins.

8. A process for coating a wood, metal, glass, plastic, mineral or textile substrate which comprises applying the aqueous composition of claim 1 to the substrate and curing the coating at room temperature to 80° C.

9. A process for coating a metal, glass, plastic or textile substrate which comprises applying the aqueous composition of claim 1 to the substrate and curing the coating at room temperature to 80° C. to 220° C.

* * * * *